June 14, 1938. C. W. SINCLAIR 2,120,632
METHOD OF FORMING WHEELS
Filed July 29, 1935 2 Sheets-Sheet 1
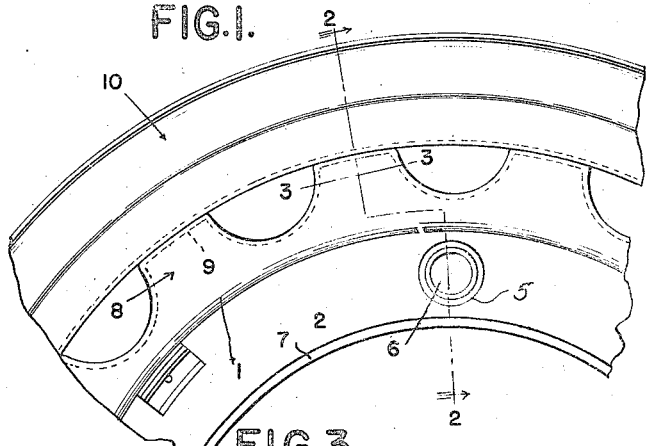
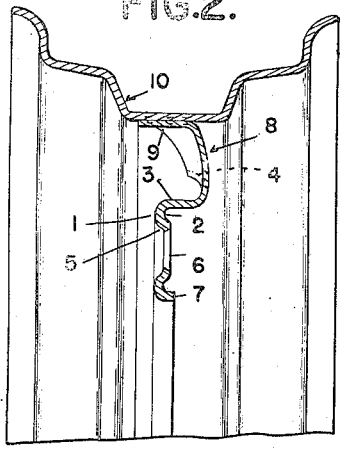
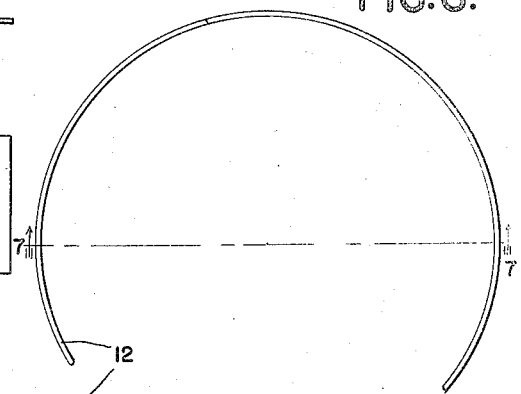
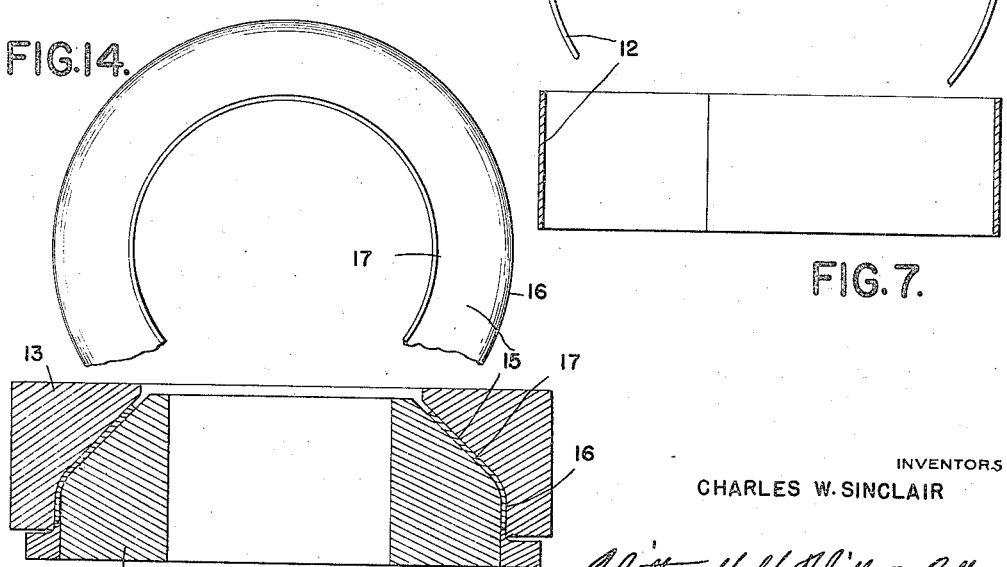
INVENTORS
CHARLES W. SINCLAIR
ATTORNEYS June 14, 1938.   C. W. SINCLAIR   2,120,632
METHOD OF FORMING WHEELS
Filed July 29, 1935   2 Sheets-Sheet 2
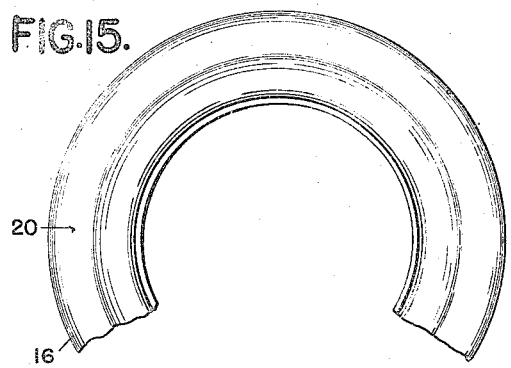
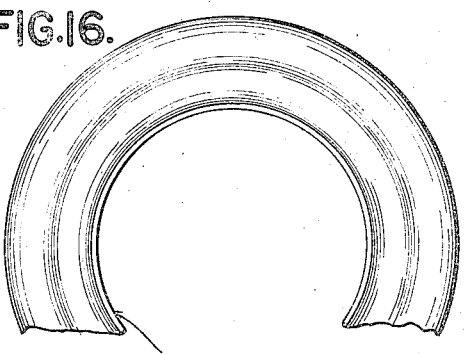
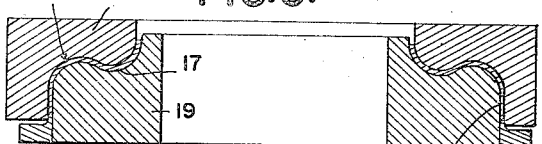
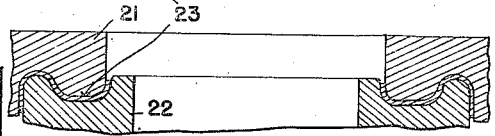
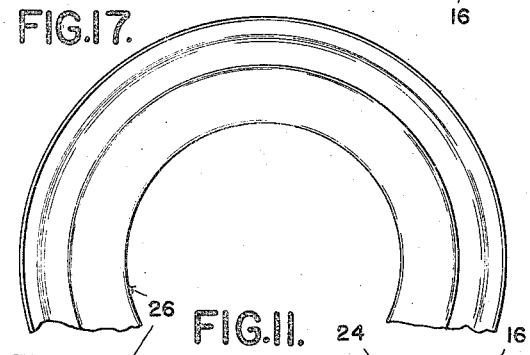
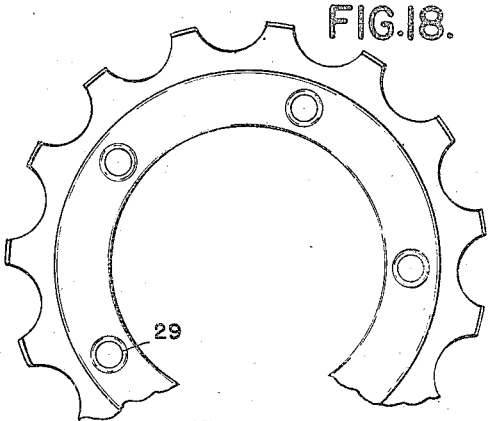
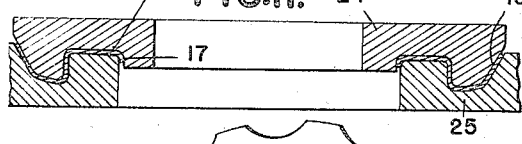
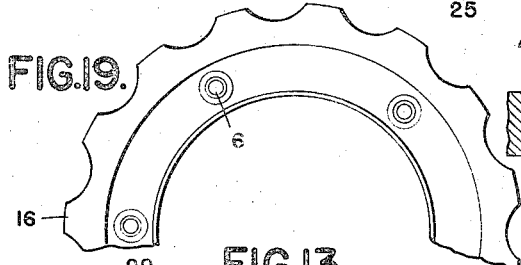
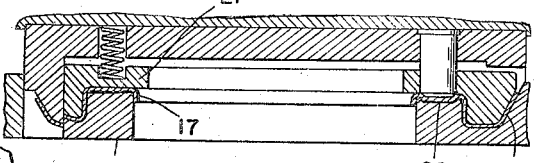
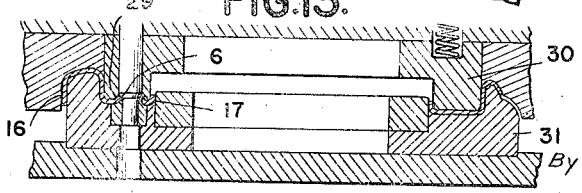
INVENTORS
CHARLES W. SINCLAIR
ATTORNEYS Patented June 14, 1938

2,120,632

UNITED STATES PATENT OFFICE 2,120,632

METHOD OF FORMING WHEELS

Charles W. Sinclair, Detroit, Mich., assignor to Kelsey-Hayes Wheel Company, Detroit, Mich., a corporation of Delaware Application July 29, 1935, Serial No. 33,785

1 Claim. (Cl. 29—159.03)

The invention relates to the manufacture of spoked vehicle wheels and refers more particularly to the manufacture of sheet metal wheels of that type having a nave of relatively large diameter.

The invention has for one of its objects the manufacture of the wheel with as little waste of stock as possible. The invention has for another of its objects to simplify the operations required for completing the wheel.

With these and other objects in view, the invention will become apparent from the following description, taken in connection with the accompanying drawings, in which—

Figure 1 is a fragmentary elevation of a wheel forming a product of my method;

Figures 2 and 3 are cross sections on the lines 2—2 and 3—3, respectively, of Figure 1;

Figure 4 is an edge elevation of the original blank;

Figure 5 is a plan view thereof;

Figure 6 is an edge elevation illustrating a succeeding step;

Figure 7 is a cross section on the line 7—7 of Figure 6;

Figures 8, 9, 10, 11, 12 and 13 are sectional views illustrating successive steps;

Figures 14, 15, 16, 17, 18 and 19 are plan views of the blanks resulting from the steps of Figures 9, 10, 11, 12 and 13, respectively.

While my invention is applicable to various modified constructions of spoked vehicle wheels, I shall describe its application to the manufacture of the sheet metal spoked wheel illustrated in Figures 1, 2 and 3, which wheel is of the following construction: I is the outer hub portion of the wheel comprising the radially extending bolting-on flange 2, the axially outwardly extending flange 3 extending from the outer periphery of the bolting-on flange and the return-bent nave portion 4 extending from the axially outer end of the flange 3. The bolting-on flange is preferably provided with the depressions 5 which are formed with the central holes 6 for receiving the bolts used in demountably securing the wheel to the inner hub. The bolting-on flange preferably terminates at its inner periphery in the axially outwardly extending flange 7. 8 are the spokes merging at their radially inner ends in the nave portion 4. These spokes are hollow and more particularly of channel-cross section with the channels opening axially inwardly of the wheel. Furthermore, these spokes are free of each other at their radially outer ends and each is provided with the integral transverse flange 9 closing the radially outer end and forming a bearing for the tire carrying rim 10. The rim is suitably secured to the spokes as by spot-welding the base of the well of the rim to the flanges 9.

In forming a wheel such as described above from sheet metal, I originally start with a flat sheet metal strip 11 of uniform gauge and of indeterminate length, such as shown in Figures 4 and 5. This strip is sheared to predetermined length, after which it is bent into tube-like form and more particularly cylindrical form and its ends are then integrated by being welded together. Then the weld flash, both inside and outside the blank and also at the edges, is trimmed, leaving the tube-like and more particularly the cylindrical blank 12, as shown in Figures 6 and 7. The external diameter of this blank is the same as the external diameter of the wheel.

The next step consists in pressing the blank 12 between the dies 13 and 14, as shown in Figure 8, to form the truncated cone-like blank 15. During this step the dies contract all of the blank 12 with the exception of the edge portion 16 and in doing so upset the metal and change the gauge to increase toward the inner periphery or the periphery contracted to the greatest extent. It will thus be seen that the blank 15 has at one edge the cylindrical portion 16 of substantially uniform gauge and the tapering portion 17 of a gauge progressively increasing in a direction away from the portion 16. The blank at the end of this step is as shown in Figures 8 and 14. This blank is next pressed between the dies 18 and 19, as shown in Figure 9, to reversely bend the contracted or tapering portion 17. This reverse bending step produces the blank 20, shown in Figures 9 and 15, having decreased axial dimension with the edges of the portions 16 and 17 forming the limits.

The next step consists in further reversely bending the blank 20 by means of the dies 21 and 22, shown in Figure 10. This produces the blank 23, shown in Figures 10 and 16, with its axial extent further decreased and the edge of its portion 17 now within its axial limits. After this additional reverse bending, the blank 23 is operated upon by the dies 24 and 25, shown in Figure 11, which make the inner periphery of the portion 17 cylindrical, or substantially so, which flatten the arcuate part of the portion 17 connecting into this inner peripheral part to form the bolting-on flange of the wheel and which also refashion the conical part of the portion 17 connecting into the outer periphery of the arcuate part to make the same substantially cylindrical and to form the axially extending flange at the outer periphery of the bolting-on flange. The dies further refashion the part of the portion 17 connecting into the portion 16 to flatten the same to some extent and flare the portion 16. After this step, the blank 26 is as shown in Figures 11 and 17.

After this forming step, the blank 26 is operated upon by the dies 27 and 28, shown in Figure 12, which scallop the outer edge portion of the blank, the operation being greatly facilitated by reason of the portion 16 being flared. More particularly, the dies cooperate to remove angularly spaced portions of the portion 16 and the adjacent part of the portion 17 radially outwardly beyond the axially extending flange extending from the outer periphery of the bolting-on flange. The dies also form the depressions or bubbles 29 in the bolting-on flange. Figures 12 and 18 illustrate the blank at the end of this step.

The fashioning of the scallops and the forming of the bolt holes is carried out by the dies 30 and 31, shown in Figure 13. These dies bend the metal, which borders the openings formed by removing the angularly spaced portions, so that this metal extends in a generally axial direction. It will thus be seen that the dies fashion the scallops into spokes of channel section and form the nave portion at the inner ends of the spokes. The dies also bend the parts of the flared portion 16 at the outer ends of the spokes so that these parts extend substantially parallel to the axis of the blank and constitute the transverse flanges upon which the rim is to be seated. The depressions or bubbles 29 are also pierced and countersunk during this step, the completed wheel being as shown in Figures 13 and 19.

After the blank has been brought to final form, it is assembled with the rim 10 and the base of the rim and the transverse flanges at the radially outer ends of the spokes are spot-welded to each other.

What I claim as my invention is:

The method of forming sheet metal spoked wheels, which comprises forming a tube-like blank from a strip, pressing the tube-like blank and thereby contracting and upsetting a portion thereof into conical form while maintaining the remaining portion of the blank in axially extending relation to the conical portion, reversely bending the conical portion, thereafter flaring the remaining portion, subsequently removing angularly spaced portions of the remaining portion and thereby forming openings, and pressing the material bordering the openings in a generally axial direction to form channel section spokes with the sides of adjacent spokes connected by flanges.

CHARLES W. SINCLAIR.